(12) United States Patent
Clapper et al.

(10) Patent No.: US 11,692,112 B2
(45) Date of Patent: Jul. 4, 2023

(54) LOW TEMPERATURE VIBRATION DAMPING PRESSURE SENSITIVE ADHESIVES AND CONSTRUCTIONS

(71) Applicant: 3M INNOVATIVE PROPERTIES COMPANY, St. Paul, MN (US)

(72) Inventors: Jason D. Clapper, Lino Lakes, MN (US); Arlin L. Weikel, Mansfield, PA (US); Thu-Van T. Tran, Maplewood, MN (US); Kevin M. Lewandowski, Inver Grove Heights, MN (US); David A. Gries, Indianapolis, IN (US); Daniel J. Renninger, Lebanon, IN (US)

(73) Assignee: 3M Innovative Properties Company, St. Paul, MN (US)

( * ) Notice: Subject to any disclaimer, the term of this patent is extended or adjusted under 35 U.S.C. 154(b) by 16 days.

(21) Appl. No.: 16/392,332

(22) Filed: Apr. 23, 2019

(65) Prior Publication Data
US 2019/0249044 A1    Aug. 15, 2019

Related U.S. Application Data

(60) Division of application No. 15/367,705, filed on Dec. 2, 2016, now abandoned, which is a continuation of application No. 14/369,316, filed as application No. PCT/US2012/071650 on Dec. 26, 2012, now abandoned.

(60) Provisional application No. 61/675,536, filed on Jul. 25, 2012, provisional application No. 61/581,374, filed on Dec. 29, 2011.

(51) Int. Cl.
| | |
|---|---|
| *C09J 7/10* | (2018.01) |
| *C09J 7/38* | (2018.01) |
| *C08F 220/18* | (2006.01) |
| *C09J 133/08* | (2006.01) |
| *C08L 33/10* | (2006.01) |
| *C08K 3/36* | (2006.01) |
| *C08L 33/08* | (2006.01) |

(52) U.S. Cl.
CPC ............ *C09J 7/10* (2018.01); *C08F 220/1808* (2020.02); *C08F 220/1818* (2020.02); *C08K 3/36* (2013.01); *C08L 33/08* (2013.01); *C08L 33/10* (2013.01); *C09J 7/385* (2018.01); *C09J 133/08* (2013.01); *C09J 2423/00* (2013.01); *C09J 2433/00* (2013.01); *C09J 2433/006* (2013.01); *Y10T 428/2848* (2015.01); *Y10T 428/2891* (2015.01); *Y10T 428/31692* (2015.04); *Y10T 428/31938* (2015.04)

(58) Field of Classification Search
CPC ....... C09J 7/10; C09J 7/385; C09J 7/29; C09J 11/04; C09J 11/08; C09J 7/00; C09J 2433/00; C09J 2423/00; C09J 2433/006; C09J 133/08; C09J 133/10; C08F 230/08; C08F 220/18; C08F 220/1818; C08L 33/08; C08L 33/10; Y10T 428/2848; Y10T 428/2891; Y10T 428/31692; Y10T 428/31938

See application file for complete search history.

(56) References Cited

U.S. PATENT DOCUMENTS

| | | | |
|---|---|---|---|
| 4,803,105 A | 2/1989 | Kretow | |
| 5,118,562 A | 6/1992 | Johnson | |
| 5,464,659 A | 11/1995 | Melancon | |
| 6,586,483 B2 | 7/2003 | Kolb | |
| 2004/0242770 A1 | 12/2004 | Feldstein | |
| 2005/0118430 A1 | 6/2005 | Doi | |
| 2008/0118751 A1* | 5/2008 | Zollner | C09J 133/04 428/343 |
| 2009/0186164 A1* | 7/2009 | Hirao | C09J 7/385 427/508 |
| 2010/0025038 A1 | 2/2010 | Savu | |
| 2010/0101723 A1 | 4/2010 | Okamoto | |
| 2010/0112346 A1* | 5/2010 | Kondou | C09J 7/385 428/345 |
| 2010/0324204 A1 | 12/2010 | Kawaguchi | |
| 2011/0033720 A1 | 2/2011 | Fujita | |
| 2011/0256395 A1* | 10/2011 | Zmarsly | C08L 33/08 428/354 |
| 2013/0137813 A1* | 5/2013 | Okada | C08L 9/00 524/522 |

FOREIGN PATENT DOCUMENTS

| | | |
|---|---|---|
| EP | 2 154 215 | 2/2010 |
| EP | 2 275 484 | 1/2011 |
| JP | H3-47750 | 2/1991 |
| JP | 08-325544 | 10/1996 |
| JP | 09-324164 | 12/1997 |
| JP | 11-140126 | 5/1999 |
| JP | 2001-348985 | 12/2001 |

(Continued)

OTHER PUBLICATIONS

Machine Translation of JP 2005-008654A (Year: 2005).*
International Search Report for PCT/US2012/071650, dated Mar. 22, 2013 (3 pages).

*Primary Examiner* — Scott R. Walshon
(74) *Attorney, Agent, or Firm* — Philip P. Soo

(57) ABSTRACT

Described are viscoelastic damping materials and constructions which may demonstrate low temperature performance and adhesion and which may be used in making vibration damping composites. Viscoelastic damping materials and constructions may include polymers or copolymers of monomers according to formula I:

$$CH_2=CHR^1-COOR^2 \qquad [I]$$

wherein $R^1$ is H, $CH_3$ or $CH_2CH_3$ and $R^2$ is a branched alkyl group containing 12 to 32 carbon atoms.

16 Claims, No Drawings

(56) References Cited

FOREIGN PATENT DOCUMENTS

| | | |
|---|---|---|
| JP | 2005008654 A * | 1/2005 |
| JP | 2009-236172 | 10/2009 |
| JP | 2009/249485 | 10/2009 |
| JP | 2010-265412 | 11/2010 |
| JP | 2011-016963 | 1/2011 |
| WO | WO 2006/017302 | 2/2006 |
| WO | WO 2009/154856 | 12/2009 |
| WO | WO-2010069800 A1 * | 6/2010 ............ C09J 193/00 |
| WO | WO 2011/119363 | 9/2011 |

* cited by examiner

LOW TEMPERATURE VIBRATION DAMPING PRESSURE SENSITIVE ADHESIVES AND CONSTRUCTIONS

CROSS REFERENCE TO RELATED APPLICATIONS

This application is a divisional application of pending prior application Ser. No. 15/367,705, filed Dec. 2, 2016, pending, which is a continuation of U.S. Ser. No. 14/369,316, filed Jun. 27, 2014, abandoned, which is a national stage filing under 35 U.S.C. 371 of PCT/US2012/071650, filed Dec. 26, 2012, which claims priority to U.S. Provisional Patent Application No. 61/581,374, filed Dec. 29, 2011 and U.S. Provisional Patent Application No. 61/675,536 filed Jul. 25, 2012, the disclosures of which are incorporated by reference in their entirety herein.

FIELD OF THE DISCLOSURE

This disclosure relates to viscoelastic damping materials and constructions which may demonstrate low temperature performance and adhesion and which may be used in making vibration damping composites.

SUMMARY OF THE DISCLOSURE

Briefly, the present disclosure provides a viscoelastic damping material comprising: a) a copolymer of: i) at least one monomer according to formula I:

$$CH_2=CHR^1-COOR^2 \quad [I]$$

wherein $R^1$ is H, $CH_3$ or $CH_2CH_3$ and $R^2$ is a branched alkyl group containing 12 to 32 carbon atoms, and ii) at least one second monomer; and b) at least one adhesion-enhancing material. In some embodiments, the adhesion-enhancing material is one of: inorganic nanoparticles, core-shell rubber particles, polybutene materials, or polyisobutene materials. Typically $R^2$ is a branched alkyl group containing 15 to 22 carbon atoms. Typically $R^1$ is H or $CH_3$. Typically second monomers are acrylic acid, methacrylic acid, ethacrylic acid, acrylic esters, methacrylic esters or ethacrylic esters. The viscoelastic damping material may additionally comprise a plasticizer.

In another aspect, the present disclosure provides a viscoelastic damping material comprising a copolymer of: i) at least one monomer according to formula I:

$$CH_2=CHR^1-COOR^2 \quad [I]$$

wherein $R^1$ is H, $CH_3$ or $CH_2CH_3$ and $R^2$ is a branched alkyl group containing 12 to 32 carbon atoms, and ii) a monofunctional silicone (meth)acrylate oligomer. Typically $R^2$ is a branched alkyl group containing 15 to 22 carbon atoms. Typically $R^1$ is H or $CH_3$. The viscoelastic damping material may additionally comprise a plasticizer.

In another aspect, the present disclosure provides a viscoelastic construction comprising: a) at least one viscoelastic layer comprising a polymer or copolymer of at least one monomer according to formula I:

$$CH_2=CHR^1-COOR^2 \quad [I]$$

wherein $R^1$ is H, $CH_3$ or $CH_2CH_3$ and $R^2$ is a branched alkyl group containing 12 to 32 carbon atoms; bound to b) at least one PSA layer comprising a pressure sensitive adhesive. In some embodiments, the viscoelastic layer is bound to at least two layers comprising a pressure sensitive adhesive. Typically $R^2$ is a branched alkyl group containing 15 to 22 carbon atoms. Typically $R^1$ is H or $CH_3$. In some embodiments, the viscoelastic layer comprises copolymer which is a copolymer of at least one second monomer selected from acrylic acid, methacrylic acid, ethacrylic acid, acrylic esters, methacrylic esters, or ethacrylic esters. In some embodiments, the PSA layer comprises an acrylic pressure sensitive adhesive. In some embodiments, the PSA layer comprises an acrylic pressure sensitive adhesive which is a copolymer of acrylic acid.

In another aspect, the present disclosure provides a viscoelastic construction comprising: a) discrete particles of a polymer or copolymer of at least one monomer according to formula I:

$$CH_2=CHR^1-COOR^2 \quad [I]$$

wherein $R^1$ is H, $CH_3$ or $CH_2CH_3$ and $R^2$ is a branched alkyl group containing 12 to 32 carbon atoms; dispersed in b) a PSA layer comprising a pressure sensitive adhesive. In some embodiments, the PSA layer comprises an acrylic pressure sensitive adhesive. In some embodiments, the PSA layer comprises an acrylic pressure sensitive adhesive which is a copolymer of acrylic acid.

In another aspect, the present disclosure provides a vibration damping composite comprising a viscoelastic damping material or a vibration damping composite of the present disclosure adhered to at least one substrate. In some embodiments, the material or construction is adhered to at least two substrates. In some embodiments, at least one substrate is a metal substrate.

DETAILED DESCRIPTION

The present disclosure provides material sets and constructions that demonstrate a pressure sensitive adhesive (PSA) that offers both vibration damping performance at very low temperatures and high frequencies as well as substantial adhesive performance and durability when used with a variety of substrates over a wide range of temperatures. The combination of both low temperature damping and adhesive performance attained using a single material set or construction represents a significant technical challenge in the field of visco-elastic damping materials. In some embodiments of the present disclosure, this is achieved through the use of specialty acrylic materials, specific additives, multi-layer construction, or combinations of the above.

The present disclosure provides material sets and constructions that demonstrate a pressure sensitive adhesive that offers both vibration damping performance at very low temperatures and high frequencies as well as substantial adhesive performance and durability when used with a variety of substrates over a wide range of temperatures. In some embodiments, materials or constructions according to the present disclosure exhibit high tan delta, as measured by Dynamic Mechanical Analysis (DMA) at −55° C. and 10 Hz as described in the examples below. In some embodiments, materials or constructions according to the present disclosure exhibit tan delta (as measured by Dynamic Mechanical Analysis (DMA) at −55° C. and 10 Hz as described in the examples below) of greater than 0.5, in some embodiments greater than 0.8, in some embodiments greater than 1.0, in some embodiments greater than 1.2, and in some embodiments greater than 1.4. In some embodiments, materials or constructions according to the present disclosure exhibit high peel adhesion, as measured as described in the examples below. In some embodiments, materials or constructions according to the present disclosure exhibit peel adhesion (as measured as described in the examples below) of greater than 10 N/dm, in some embodiments greater than 20 N/dm, in some embodiments greater than 30 N/dm, in some embodiments greater than 40 N/dm, in some embodiments greater than 50 N/dm, and in some embodiments greater than 60 N/dm. In some embodiments, materials or constructions according to the present simultaneously achieve high tan delta, at one or more of the levels described above, and high peel strength, at one or more of the levels described above.

In some embodiments, viscoelastic damping materials according to the present disclosure include long alkyl chain acrylate copolymers which are copolymers of monomers including one or more long alkyl chain acrylate monomers. The long alkyl chain acrylate monomers are typically acrylic acid, methacrylic acid or ethacrylic acid esters but typically acrylic acid esters. In some embodiments, the side chain of the long alkyl chain contains 12 to 32 carbon atoms (C12-C32), in some embodiments at least 15 carbon atoms, in some embodiments at least 16 carbon atoms, in some embodiments 22 or fewer carbon atoms, in some embodiments 20 or fewer carbon atoms, in some embodiments 18 or fewer carbon atoms, and in some embodiments 16-18 carbon atoms. Typically, the long alkyl chain has at least one branch point to limit crystallinity in the formed polymer that may inhibit damping performance. Long chain alkyl acrylates with no branch points may be used in concentrations low enough to limit crystallinity of the formed polymer at application temperatures. In some embodiments, additional comonomers are selected from acrylic acid, methacrylic acid or ethacrylic acid, but typically acrylic acid. In some embodiments, additional comonomers are selected from acrylic, methacrylic or ethacrylic esters, but typically acrylic esters.

In some embodiments, the long alkyl chain acrylate copolymers comprise additional comonomers or additives that join in the polymerization reaction, which imparting adhesive properties. Such comonomers may include polyethylene glycol diacrylates.

In some embodiments, the long alkyl chain acrylate copolymers comprise additional comonomers or additives that join in the polymerization reaction, which can help to impart greater adhesive properties through modulation of the rheological properties of the viscoelastic damping copolymer, or through the addition of functional groups. Such comonomers may include but are not limited to (meth) acrylic acid, hydroxyethyl (meth)acrylate, dimethylaminoethyl (meth)acrylate, monofunctional silicone (meth)acrylates, and isobornyl (meth)acrylate.

In some embodiments, the viscoelastic damping copolymer may be crosslinked to improve the durability and adhesion properties of the material. Such crosslinking agents can include but are not limited to photoactivated crosslinkers such as benzophenones, or 2,4-bis(trichloromethyl)-6-(4-methoxyphenyl)-triazine. Crosslinking agents can also include copolymerizable multifunctional acrylates such as polyethylene glycol diacrylate or hexanediol diacrylate as examples.

In some embodiments the viscoelastic damping copolymer may be polymerized through all known polymerization methods including thermally activated or photoinitiated polymerization. Such photopolymerization processes can include for example common photoinitiators such as diphenyl (2,4,6-trimethylbenzoyl)-phosphine oxide.

In some embodiments, viscoelastic damping materials according to the present disclosure include long alkyl chain acrylate copolymers and additional adhesion-enhancing materials which impart adhesive properties. Such additional adhesion-enhancing materials may include polybutenes, silicones, or polyisobutenes. Such additional adhesion-enhancing materials may also be particulate materials. Such particulate adhesion-enhancing materials may include fumed silica, core-shell rubber particles, or isostearyl acrylate microspheres.

In some embodiments, long alkyl chain acrylate copolymers according to the present disclosure form a part of a multilayer viscoelastic construction. In some embodiments, the long alkyl chain acrylate copolymers according to the present disclosure form a viscoelastic damping layer of a two-layer viscoelastic construction, the second, attached layer being a layer of more highly adhesive material over a broader temperature range. In some embodiments, the long alkyl chain acrylate copolymers according to the present disclosure form a viscoelastic damping core layer of a multilayer viscoelastic construction, sandwiched between two layers of more highly adhesive material. In some embodiments, the long alkyl chain acrylate copolymers according to the present disclosure form a layer of a multilayer viscoelastic construction which additionally comprises at least one layer of more highly adhesive material. In some embodiments, the long alkyl chain acrylate copolymers according to the present disclosure form an interior layer of a multilayer viscoelastic construction which additionally comprises at least two layers of more highly adhesive material. In some embodiments, the more highly adhesive material is an acrylic PSA material.

In some embodiments, a two-layer viscoelastic construction comprises a viscoelastic layer attached to a second layer which is a layer of more highly adhesive material. In some embodiments, the two-layer viscoelastic construction is made by lamination of a viscoelastic layer to an adhesive layer. In some embodiments, the two-layer viscoelastic construction is made by application of an adhesive tape to a viscoelastic layer. In some embodiments, the two-layer viscoelastic construction is made by application of an adhesive in liquid or aerosolized form to a viscoelastic damping layer to provide greater adhesion to the damping layer. In some embodiments, the two-layer viscoelastic construction is made by application of an adhesive in paste form to a viscoelastic layer. In some embodiments, a two-layer viscoelastic construction is provided in the form of a roll, sheet, or pre-cut article. In some embodiments, a two-layer viscoelastic construction is made shortly prior to use by application of an adhesive to a viscoelastic layer. In some embodiments, a two-layer viscoelastic construction is made in situ by application of an adhesive to a substrate followed by application of a viscoelastic layer to the adhesive.

In some embodiments, the multilayer viscoelastic construction comprises a viscoelastic layer sandwiched between two layers of more highly adhesive material. In some embodiments, the multilayer viscoelastic construction is made by lamination of a viscoelastic layer to at least one adhesive layer. In some embodiments, the multilayer viscoelastic construction is made by application of an adhesive tape to at least one side of a viscoelastic layer. In some embodiments, the multilayer viscoelastic construction is made by application of an adhesive in liquid form to at least one side of a viscoelastic layer. In some embodiments, the multilayer viscoelastic construction is made by application of an adhesive in paste form to at least one side of a viscoelastic layer. In some embodiments, a multilayer viscoelastic construction is provided in the form of a roll, sheet, or pre-cut article. In some embodiments, a multilayer viscoelastic construction is made shortly prior to use by application of an adhesive to a viscoelastic layer. In some embodiments, a multilayer viscoelastic construction is made in situ by application of an adhesive to a substrate followed by application of a viscoelastic layer to the adhesive, followed by application to the viscoelastic layer of additional adhesive or an additional adhesive-bearing substrate. In some embodiments, the multilayer construction is made in-situ by application of the viscoelastic damping composition in liquid form between two adhesive layers followed by a subsequent cure of the damping layer to form the viscoelastic damping copolymer.

The materials or constructions according to this disclosure may be useful for aerospace applications in which maximum damping performance of high frequency vibration energy is required at very low temperatures, in combination with good adhesion properties.

Objects and advantages of this disclosure are further illustrated by the following examples, but the particular materials and amounts thereof recited in these examples, as well as other conditions and details, should not be construed to unduly limit this disclosure.

Examples

Unless otherwise noted, all reagents were obtained or are available from Sigma-Aldrich Company, St. Louis, Mo., or may be synthesized by known methods. Unless otherwise reported, all ratios are by weight percent.

The following abbreviations are used to describe the examples:
° F.: degrees Fahrenheit
° C.: degrees Centigrade
cm: centimeters
$g/cm^3$: grams per cubic centimeter
Kg: kilograms
$Kg/m^3$: kilograms per cubic meter
mil: $10^{-3}$ inches
$mJ/cm^2$: millijoules per square centimeter
ml: milliliters
mm: millimeters
micrometers
N/dm: Newtons per decimeter
pcf: pounds per cubic foot
pph: parts per hundred Test Methods Peel Adhesion Test (PAT)

The force required to peel the test material from a substrate at an angle of 180 degrees was measured according to ASTM D 3330/D 3330M-04. Using a rubber roller, the adhesive sample was manually laminated onto a primed 2 mil (50.8 µm) polyester film, obtained under the trade designation "HOSTAPHAN 3 SAB" from Mitsubishi Plastics, Inc., Greer, S.C., and allowed to dwell for 24 hours at 23° C./50% relative humidity. A 0.5×6 inches (1.27×12.7 cm) section was cut from the laminated film and taped to either a 0.10 inch (2.54 mm) or 0.20 inch (5.08 mm) thick, Shore A 70, 320 $Kg/m^3$ polyether-polyurethane foam, or a grade 2024 aluminum test coupon, obtained from Aerotech Alloys, Inc., Temecula, Calif. The tape was then manually adhered onto the test coupon using a 2 Kg rubber roller and conditioned for 24 hours at 23° C./50% relative humidity. The peel adhesive force was then determined using a tensile force tester, model "SP-2000", obtained Imass Inc., Accord, Mass., at a platen speed of 12 in./min (0.305 m/min.). Three tape samples were tested per example or comparative, and the average value reported in N/dm. Also reported are the failure modes, abbreviated as follows:

A: Adhesive tape cleanly delaminated from the substrate

2B: Two-bond failure, wherein the adhesive tape delaminated from the carrier backing C: Cohesive failure, wherein the adhesive layer ruptured, leaving material on both the backing and the substrate.

Dynamic Mechanical Analysis (DMA)

Dynamic Mechanical Analysis (DMA) was determined using a parallel plate rheometer, model "AR2000" obtained from TA Instruments, New Castle, Del. Approximately 0.5 grams of visco-elastic sample was centered between the two 8 mm diameter, aluminum parallel plates of the rheometer and compressed until the edges of the sample were uniform with the edges of the plates. The temperature of the parallel plates and rheometer shafts was then raised to 40° C. and held for 5 minutes. The parallel plates were then oscillated at a frequency of 10 Hz and a constant strain of 0.4% whilst the temperature was ramped down to −80° C. at a rate of 5° C./min. Storage modulus (G'), and tan delta were then determined.

Glass Transition Temperature (Tg)

Tan delta, the ratio of G"/G', was plotted against temperature. Tg is taken as the temperature at maximum tan delta curve.

Damping Loss Factor (DLF)

A composite material was prepared for Damping Loss Factor as follows. A nominally 6 by 48 inch by 7 mil (15.24 by 121.92 cm by 0.178 mm) strip of aluminum was cleaned with a 50% aqueous solution of isopropyl alcohol and wiped dry. A primer, type "LORD 7701", obtained from Lord Corporation, Cary, N.C., was applied to a nominally 6 by 48 by 0.1 inch (15.24 by 121.92 cm by 2.54 mm) strip of 20 pcf (0.32 $g/cm^3$) white foraminous micro cellular high density polyurethane foam. The adhesive tape was applied to the aluminum strip, nipped together to ensure wet out, then applied to the primed surface of the high density urethane. A 5 mil (127 µm) adhesive transfer tape, obtained under the trade designation "VHB 9469PC" obtained from 3M Company, St. Paul, Minn., was then applied on the opposite side of the urethane strip. The resulting composite material cut into 2 by 24 inch (5.08 by 60.96 cm) samples and applied to a 3×40 inch×0.062 mil (7.62×101.4 cm×1.58 mm) aluminum beam.

The beam was suspended by its first nodal points, and the center of the beam mechanically coupled to an electromagnetic shaker model "V203" from Brüel & Kjær North America, Inc., Norcross, Ga., via an inline force transducer, model "208M63" from PCB Piezotronics, Inc., Depew, N.Y., in a thermally controlled chamber at temperatures of −10° C., −20° C. and −30° C. On the opposite side of the beam to the inline force transducer was mounted an accelerometer, model "353B16 ICP", also from Piezotronics, Inc. A broad band signal was sent to the electromagnetic shaker and the force the shaker excerpted on the beam was measured, as was the resulting acceleration of the beam. The frequency response function (FRF) was calculated from the cross spectrum of the measured acceleration and force, and from the magnitude of the FRF, peak amplitudes were used to identify the modal frequencies. The half power bandwidth around each modal frequency was also identified as the span of frequencies between the −3 dB amplitude points above and below the modal frequency. The ratio of the half power bandwidth to modal frequency was calculated and reported as the Damping Loss Factor.

Materials

Abbreviations for the reagents used in the examples are as follows:

A-75: A benzoyl peroxide, obtained under the trade designation "LUPEROX A75" from Arkema, Inc. Philadelphia, Pa.

AA: Acrylic acid, obtained from Sigma-Aldrich Company, St. Louis, Mo.

BDDA: 1,4-butanediol diacrylate, obtained under the trade designation "SR213" from Sartomer, USA, LLC, Exton, Pa.

DMAEMA: N,N-dimethylaminoethylmethacrylate, obtained from Sigma-Aldrich Company.

E-920: A methacrylate-butadiene-styrene copolymer, obtained under the trade designation "CLEARSTRENGTH E-920" from Arkema, Inc., King of Prussia, Pa.

F-85E: Ester of hydrogenated rosin, obtained under the trade designation "FORAL 85-E" from Eastman Chemical Company, Kingsport, Tenn.

HDDA: 1,6-hexanediol diacrylate, obtained under the trade designation "SR238B" from Sartomer, USA, LLC.

I-651: 2,2-Dimethoxy-1,2-diphenylethan-1-one, obtained under the trade designation "IRGACURE 651" from BASF Schweiz AG, Basel, Switzerland.

IOA: Isooctyl acrylate, obtained under the trade designation "SR440" from Sartomer, USA, LLC.

IOTMS: Isooctyltrimethoxysilane, obtained from Gelest, Inc., Morrisville, Pa.

ISF-16: 2-hexyldecanol, obtained under the trade designation "ISOFOL 16" from Sasol North America, Inc., Houston, Tex.

ISF-18: 2-hexyldodecanol, obtained under the trade designation "ISOFOL 18" from Sasol North America, Inc.

ISF-24: 2-decyltetradecanol, obtained under the trade designation "ISOFOL 24" from Sasol North America, Inc.

KB-1: 2,2-dimethoxy-1,2-di(phenyl)ethanone, obtained under the trade designation "ESACURE KB1" from Lamberti USA, Inc., Conshohocken, Pa.

L-26M50: A 50% solution of tert-butyl peroxy-2-ethylhexanoate in mineral spirits, obtained under the trade designation "LUPEROX 26M50" from Arkema Inc.

MTMS: Methyltrimethoxysilane, obtained from Gelest, Inc.

N2326: A 16.4% colloidal silica dispersion, obtained under the trade designation "NALCO 2326" from Nalco Company, Naperville, Ill.

PB-100: Polyisobutene having a molecular weight of 250,000 obtained under the trade designation "OPPANOL B-100" from BASF Corporation, Freeport, Tex.

PB-910: Polybutene, having a molecular weight of 910, obtained under the trade designation "INDOPOL H-100" from Ineos Oligomers, League City, Tex.

PB-1000: Polyisobutene having a molecular weight of 1,000 obtained under the trade designation "GLISSOPAL R-1000" from BASF Corporation.

PB-1900: Polybutene having a molecular weight of 2,500 obtained under the trade designation "INDOPOL H-1900" from BASF Corporation.

PEGDA: Polyethylene glycol (600) diacrylate, obtained under the trade designation "SR610" from Sartomer, USA, LLC.

R-100: A random butadiene-styrene copolymer, obtained under the trade designation "RICON 100" from Sartomer, USA, LLC.

R-972: A hydrophobic fumed silica, obtained under the trade designation "AEROSIL R-972" from Evonik Degussa Corporation, Parsippany, N.J.

RC-902: A radiation curable silicone, obtained under the trade designation "TEGO RC-902" from Evonik Degussa Corporation.

S-1001: Styrene Ethylene Propylene Block Copolymer, obtained under the trade designation "SEPTON 1001" from Kuraray Co. Ltd., Tokyo, Japan.

SAMV: Ammonium lauryl sulfate, obtained under the trade designation "STEPANOL AMV" from Stepan Company, Northfield, Ill.

T-10: Clear silicone release liner, obtained under the trade designation "CLEARSIL T-10" from Solutia, Inc. St. Louis, Mo.

T-50: Clear silicone release liner, obtained under the trade designation "CLEARSIL T-50" from Solutia, Inc.

T-145A: Silicone resin, obtained under the trade designation "TOSPEARL 145A" from Momentive Performance Materials Holdings, LLC, Columbus Ohio.

TMT: 2,4-bis(trichloromethyl)-6-(4-methoxyphenyl)-triazine.

TPO: Diphenyl (2,4,6-trimethylbenzoyl)-phosphine oxide, obtained under the trade designation "DAROCUR TPO" from BASF Schweiz AG.

467-MP: A 2 mil. (50.8 µm) adhesive transfer tape having a paper liner, obtained under the trade designation "ADHESIVE TRANSFER TAPE 467 MP" from 3M Company.

467-MPF: A 2 mil. (50.8 µm) adhesive transfer tape having a film liner, obtained under the trade designation "ADHESIVE TRANSFER TAPE 467 MPF" from 3M Company Non-commercial materials described in the examples were synthesized as follows:

HEDA: 2-hexa-1-decyl acrylate. 100 grams of 2-hexyl-1-decanol, 45.97 grams triethylamine and 350 grams of methylene chloride were added to a 1 liter flask and cooled to 5° C. using an ice bath. 41.1 grams acryloyl chloride was slowly added, dropwise over one hour, while mechanically stirring the mixture. After 10 hours the mixture was filtered and then concentrated under vacuum at 25° C. The remaining resultant oil was diluted with ethyl acetate and washed with 1.0 Molar hydrochloric acid, followed by 1.0 Molar sodium hydroxide solution, then a saturated sodium chloride solution. The organic layer was then concentrated under vacuum at 25° C. The crude oil was mixed with an equal amount of hexane and passed through a column of neutral alumina to remove colored impurities, after which the alumina was eluted with hexane. The collected filtrate was concentrated under vacuum at 25° C., resulting in a colorless oil of 2-hexa-1-decyl acrylate.

ISA: An isostearyl acrylate. 197.17 grams ISF-18, 78.12 grams triethylamine and 700 grams of methylene chloride were added to a 2 liter flask and cooled to 5° C. using an ice bath. 69.86 grams acryloyl chloride was slowly added, dropwise over one hour, while mechanically stirring the mixture. After 10 hours the mixture was filtered and then concentrated under vacuum at 25° C. The remaining resultant oil was diluted with ethyl acetate and washed with 1.0 Molar hydrochloric acid, followed by 1.0 Molar sodium hydroxide solution, then a saturated sodium chloride solution. The organic layer was then concentrated under vacuum at 25° C. The crude oil was mixed with an equal amount of hexane and passed through a column of neutral alumina to remove colored impurities, after which the alumina was eluted with hexane. The collected filtrate was concentrated under vacuum at 25° C., resulting in a colorless oil of 100% isostearyl acrylate.

ISA-MS: Isostearyl acrylate microspheres. Mixture A was prepared by adding 180 grams ISA, 0.58 grams A-75 and 1.8 grams BDDA to a 500 ml glass jar and mixed in a roller mill until dissolved. Mixture B was prepared by adding to a 1 liter glass beaker, 420 grams distilled water, 7.2 grams SAMV and 1.8 grams BDDA, and dispersing until homogeneous using a high shear mixer, model "OMNI-MIXER" from OCI Instruments, Waterbury, Conn. Mixture A was then added to the glass beaker and high shear mixing continued for approximately 2 minutes until very small droplets of about 3 microns diameter were formed. The product was then transferred to a 1 liter glass reactor equipped with a mechanical stirrer. The reactor was filled with nitrogen gas, heated to 65° C., and held at this temperature, with continuous stirring, for 24 hours, after which it was cooled to 23° C. The resulting suspension was filtered through a cheese cloth to remove agglomerates and coagulated using 500 mls isopropanol. The coagulum was then dried in an oven at 45° C. for approximately 16 hours.

Single-Layer Constructions

Sample 1

A 25 dram (92.4 mls) glass jar was charged with 19.6 grams HEDA, 0.4 grams AA and 0.008 grams 1-651. The monomer mixture was stirred for 30 minutes at 21° C., purged with nitrogen for 5 minutes, and then exposed to low intensity ultraviolet light, type "BLACK RAY XX-15BLB" obtained from Fisher Scientific, Inc., Pittsburgh, Pa., until a coatable pre-adhesive polymeric syrup was formed. An additional 0.032 grams 1-651 and 0.03 grams PEGDA were blended into the polymeric syrup using a high speed mixer, model "DAC 150 FV" obtained from FlackTek, Inc., Landrum, S.C. The polymeric syrup was then coated between silicone release liners T-10 and T-50 at an approximate thickness of 8 mils (203.2 μm) and cured by means of UV-A light at 2,000 mJ/cm$^2$.

Samples 2-6

The procedure generally described in Sample 1 was repeated, according to the quantities of acrylate monomers listed in Table 1. Physical characteristics of the resultant cured adhesive coatings are listed in Table 2.

TABLE 1

| | Composition | | | | | |
|---|---|---|---|---|---|---|
| | % Acrylate | | | | Additives (as pph of Acrylate) | |
| Sample | HEDA | IOA | ISA | AA | I-651 | PEGDA |
| 1 | 98.0 | 0 | 0 | 2.0 | 0.20 | 0.23 |
| 2 | 93.5 | 0 | 0 | 6.5 | 0.20 | 0.23 |
| 3 | 0 | 0 | 98.0 | 2.0 | 0.20 | 0.23 |
| 4 | 100.0 | 0 | 0 | 0 | 0.20 | 0.23 |
| 5 | 0 | 0 | 100.0 | 0 | 0.20 | 0.23 |
| 6 | 0 | 93.5 | 0 | 6.5 | 0.20 | 0.23 |

TABLE 2

| | Adhesion To Polyurethane | | Adhesion To Aluminum | | | |
|---|---|---|---|---|---|---|
| Sample | Peel Adhesive Force (N/dm) | Failure Mode | Peel Adhesive Force (N/dm) | Failure Mode | Storage Modulus @ −55° C. | Tan Delta @ −55° C. |
| 1 | 26 | A | 21 | A | $3.3 \times 10^6$ | 0.96 |
| 2 | 21 | A | 48 | A | $2.0 \times 10^7$ | 0.72 |
| 3 | 24 | A | 15 | A | $1.3 \times 10^7$ | 1.09 |
| 4 | 3 | C | 3 | C | $1.1 \times 10^6$ | 1.50 |
| 5 | 10 | A | 4 | A | $3.5 \times 10^6$ | 1.36 |
| 6 | 25 | A | 64 | A | $3.1 \times 10^8$ | 0.10 |

Sample 7

A 25 dram (92.4 mls) glass jar was charged with 19.6 grams HEDA, 0.4 grams AA and 0.008 grams 1-651. The monomer mixture was stirred for 30 minutes at 21° C., purged with nitrogen for 5 minutes, and exposed to the low intensity ultraviolet light until a coatable pre-adhesive polymeric syrup was formed. An additional 0.032 grams 1-651, 0.046 grams PEGDA and 2.0 grams R-972 were subsequently blended into the polymeric syrup using the high speed mixer. The polymeric syrup was then coated between silicone release liners at an approximate thickness of 8 mils (203.2 μm) and cured by means of UV-A light at 2000 mJ/cm$^2$.

Samples 8-33

The procedure generally described in Sample 7 was repeated, wherein various amounts of fumed silica, plasticizer, polybutenes, polyisobutenes, silicones, core-shell rubber particles and isostearyl acrylate microspheres, were blended into the pre-adhesive polymeric syrup according to the quantities listed in Table 3. Physical characteristics of the resultant cured adhesive coatings are listed in Table 4.

TABLE 3

| | Composition | | | | | | | | | |
|---|---|---|---|---|---|---|---|---|---|---|
| | % Acrylate | | | Additives (as pph of Acrylate) | | | | | | |
| Sample | HEDA | AA | ISA | R-972 | PEGDA | TMT | ISF-24 | PB-910 | PB-1000 | PB-1900 |
| 7 | 99.0 | 1.0 | 0 | 10.0 | 0.23 | 0 | 0 | 0 | 0 | 0 |
| 8 | 98.0 | 2.0 | 0 | 7.0 | 0.23 | 0 | 0 | 0 | 0 | 0 |
| 9 | 98.0 | 2.0 | 0 | 10.0 | 0.23 | 0 | 0 | 0 | 0 | 0 |
| 10 | 98.0 | 2.0 | 0 | 13.0 | 0.23 | 0 | 0 | 0 | 0 | 0 |
| 11 | 0 | 2.0 | 98.0 | 7.0 | 0.23 | 0 | 0 | 0 | 0 | 0 |
| 12 | 0 | 2.0 | 98.0 | 10.0 | 0.23 | 0 | 0 | 0 | 0 | 0 |
| 13 | 93.5 | 5.0 | 0 | 10.0 | 0.23 | 0 | 0 | 0 | 0 | 0 |
| 14 | 98.0 | 2.0 | 0 | 10.0 | 0.23 | 0 | 4.0 | 0 | 0 | 0 |
| 15 | 98.0 | 2.0 | 0 | 10.0 | 0.23 | 0 | 5.0 | 0 | 0 | 0 |
| 16 | 98.0 | 2.0 | 0 | 0 | 0.20 | 0 | 0 | 0 | 5.0 | 0 |
| 17 | 98.0 | 2.0 | 0 | 5.0 | 0.20 | 0 | 0 | 0 | 5.0 | 0 |
| 18 | 98.0 | 2.0 | 0 | 5.0 | 0.20 | 0 | 0 | 0 | 10.0 | 0 |
| 19 | 98.0 | 2.0 | 0 | 5.0 | 0.20 | 0 | 0 | 5.0 | 0 | 0 |
| 20 | 98.0 | 2.0 | 0 | 5.0 | 0.20 | 0 | 0 | 0 | 0 | 5.0 |
| 21 | 98.0 | 2.0 | 0 | 5.0 | 0 | 0.15 | 0 | 0 | 15.0 | 0 |
| 22 | 98.0 | 2.0 | 0 | 5.0 | 0.20 | 0 | 0 | 0 | 5.0 | 0 |

| | Composition | | | | | | | | | |
|---|---|---|---|---|---|---|---|---|---|---|
| | % Acrylate | | | Additives (as pph of Acrylate) | | | | | | |
| Sample | HEDA | AA | IOA | ISA-MS | PEGDA | TMT | T-145A | RC-902 | HDDA | E-920 |
| 23 | 0 | 6.5 | 93.5 | 0 | 0 | 0 | 5.0 | 0 | 0 | 0 |
| 24 | 0 | 6.5 | 93.5 | 0 | 0 | 0 | 10.0 | 0 | 0 | 0 |
| 25 | 93.5 | 6.5 | 0 | 0 | 0 | 0 | 5.0 | 0 | 0 | 0 |
| 26 | 98.0 | 2.0 | 0 | 0 | 0 | 0 | 0 | 10.0 | 0.08 | 0 |
| 27 | 98.0 | 2.0 | 0 | 0 | 0.20 | 0 | 0 | 0 | 0 | 10.0 |
| 28 | 98.0 | 2.0 | 0 | 0 | 0 | 0.15 | 0 | 0 | 0 | 5.0 |
| 29 | 0 | 6.5 | 93.5 | 5.0 | 0.23 | 0 | 0 | 0 | 0 | 0 |
| 30 | 0 | 6.5 | 93.5 | 10.0 | 0.23 | 0 | 0 | 0 | 0 | 0 |
| 31 | 93.5 | 6.5 | 0 | 10.0 | 0.23 | 0 | 0 | 0 | 0 | 0 |

| | Composition | | | | | | | |
|---|---|---|---|---|---|---|---|---|
| | % Acrylate | | | Additives (as pph of Acrylate) | | | | |
| Sample | HEDA | AA | IOA | PEGDA | HDDA | PB-100 | S-1001 | D-TPO |
| 32 | 100.0 | 0 | 0 | 0 | 0.1 | 6.0 | 0 | 0.3 |
| 33 | 100.0 | 0 | 0 | 0 | 0.1 | 0 | 10.0 | 0.3 |

TABLE 4

| | Adhesion To Polyurethane | | Adhesion To Aluminum | | | |
|---|---|---|---|---|---|---|
| Sample | Peel Adhesion Force (N/dm) | Failure Mode | Peel Adhesion Force (N/dm) | Failure Mode | Storage Modulus @ −55° C. | Tan Delta @ −55° C. |
| 7 | 2 | A | 1 | A | $1.4 \times 10^6$ | 1.67 |
| 8 | 22 | A | 35 | A | $1.2 \times 10^7$ | 0.96 |
| 9 | 26 | A | 27 | A | $4.0 \times 10^7$ | 0.92 |
| 10 | 23 | A | 24 | A | $3.6 \times 10^7$ | 0.89 |
| 11 | 153 | C | 120 | C | $1.8 \times 10^7$ | 1.04 |
| 12 | 55 | 2B | 77 | 2B | $1.3 \times 10^7$ | 1.01 |
| 13 | 24 | A | 47 | 2B | $2.9 \times 10^7$ | 0.64 |
| 14 | 96 | C | 92 | C | $2.6 \times 10^7$ | 0.97 |
| 15 | 76 | C | 69 | C | $1.8 \times 10^6$ | 0.95 |
| 16 | 26 | A | 22 | A | $1.5 \times 10^6$ | 1.15 |
| 17 | 85 | A | 88 | 2B | $7.7 \times 10^6$ | 1.13 |
| 18 | 77 | C | 79 | C | $1.1 \times 10^7$ | 1.22 |
| 19 | 57 | A | 39 | A | $8.1 \times 10^6$ | 1.15 |
| 20 | 55 | A | 39 | A | $1.4 \times 10^7$ | 1.08 |
| 21 | 54 | A | 48 | A | $8.4 \times 10^6$ | 1.30 |
| 22 | 125 | C | 56 | A | $9.1 \times 10^6$ | 1.04 |
| 23 | 16 | A | 37 | A | $3.5 \times 10^8$ | 0.58 |
| 24 | 18 | A | 36 | A | $3.8 \times 10^8$ | 1.26 |
| 25 | 20 | A | 22 | A | $3.0 \times 10^7$ | 0.70 |

TABLE 4-continued

| | Adhesion To Polyurethane | | Adhesion To Aluminum | | | |
|---|---|---|---|---|---|---|
| Sample | Peel Adhesion Force (N/dm) | Failure Mode | Peel Adhesion Force (N/dm) | Failure Mode | Storage Modulus @ −55° C. | Tan Delta @ −55° C. |
| 26 | 1 | A | 0 | A | $1.3 \times 10^6$ | 1.16 |
| 27 | 16 | A | 12 | A | $7.2 \times 10^6$ | 1.01 |
| 28 | 15 | A | 16 | A | $1.4 \times 10^7$ | 1.06 |
| 29 | 31 | A | 77 | A | $2.7 \times 10^6$ | 1.10 |
| 30 | 28 | A | 97 | A | $3.2 \times 10^6$ | 1.10 |
| 31 | 26 | A | 68 | A | $5.2 \times 10^5$ | 0.86 |
| 32 | 5 | A | 4 | A | $4.8 \times 10^6$ | 1.35 |
| 33 | 2 | A | 3 | A | $7.7 \times 10^6$ | 1.18 |

Visco-Elastic Core VEC-1

A 25 dram (92.4 mls) glass jar was charged with 19.8 grams HEDA, 0.2 grams DMAEMA and 0.008 grams 1-651. The monomer mixture was stirred for 30 minutes at 21° C., purged with nitrogen for 5 minutes, and exposed to the low intensity ultraviolet light until a coatable pre-adhesive polymeric syrup was formed. An additional 0.032 grams 1-651 and 0.03 grams TMT were subsequently blended into the polymeric syrup using the high speed mixer. The polymeric syrup was then coated between silicone release liners T-10 and T-50 at an approximate thickness of 8 mils (203.2 μm) and cured by means of UV-A light at 2,000 mJ/cm².

Visco-Elastic Cores VEC-2-VEC-10

The procedure generally described in VEC-1 was repeated, according to the compositions listed in Table 5. With respect to VEC-6, the nominal thickness was 16 mils (406.4 μm). Physical characteristics of the visco-elastic cores are listed in Table 6.

TABLE 5

| | Composition | | | | | |
|---|---|---|---|---|---|---|
| Visco-Elastic | % Acrylate | | | | Additives (as pph of Acrylate) | |
| Core | HEDA | ISA | IOA | DMAEMA | TMT | PEGDA |
| VEC-1 | 99.0 | 0 | 0 | 1.0 | 0.15 | 0 |
| VEC-2 | 98.0 | 0 | 0 | 2.0 | 0.15 | 0 |
| VEC-3 | 96.0 | 0 | 0 | 4.0 | 0.15 | 0 |
| VEC-4 | 0 | 96.0 | 0 | 4.0 | 0 | 0.23 |
| VEC-5 | 0 | 0 | 96.0 | 4.0 | 0 | 0.23 |
| VEC-6 | 0 | 96.0 | 0 | 4.0 | 0.15 | 0 |
| VEC-7 | 0 | 90.0 | 10.0 | 0 | 0.15 | 0 |
| VEC-8 | 0 | 100.0 | 0 | 0 | 0.15 | 0 |
| VEC-9 | 0 | 0 | 100.0 | 0 | 0.15 | 0 |
| VEC-10 | 0 | 75.0 | 25.0 | 0 | 0.15 | 0 |

TABLE 6

| Visco-Elastic Core | Core Thickness mils (μm) | Storage Modulus @ −55° C. | Tan Delta @ −55° C. |
|---|---|---|---|
| VEC-1 | 8 (203.2) | $2.4 \times 10^6$ | 1.33 |
| VEC-2 | 8 (203.2) | $3.2 \times 10^6$ | 1.32 |
| VEC-3 | 8 (203.2) | $5.1 \times 10^6$ | 1.32 |
| VEC-4 | 8 (203.2) | $6.0 \times 10^6$ | 1.36 |
| VEC-5 | 8 (203.2) | $2.6 \times 10^8$ | 0.13 |
| VEC-6 | 16 (406.4) | $5.9 \times 10^6$ | 1.37 |
| VEC-7 | 8 (203.2) | $1.0 \times 10^7$ | 1.35 |
| VEC-8 | 8 (203.2) | $1.1 \times 10^7$ | 1.34 |
| VEC-9 | 8 (203.2) | $2.6 \times 10^8$ | 0.14 |
| VEC-10 | 8 (203.2) | $1.6 \times 10^7$ | 1.26 |

Multi-Layer Constructions
Adhesive Skin SKN-1

A one quart (946 mls.) glass jar was charged with 372 grams IOA, 28 grams AA and 0.16 grams 1-651. The monomer mixture was stirred for 30 minutes at 21° C., purged with nitrogen for 5 minutes, and exposed to the low intensity (0.3 mW/cm²) ultraviolet light until a coatable pre-adhesive polymeric syrup was formed. An additional 0.64 grams 1-651 and 0.6 grams TMT were subsequently blended into the polymeric syrup using the high speed mixer. The polymeric syrup was then coated between silicone release liners T-10 and T-50 at an approximate thickness of 1 to 2 mils (25.4-50.8 μm) and cured by means of UV-A light at 1,500 mJ/cm².

Adhesive Skins SKN-2-SKN-4

The procedure generally described in SKN-1 was repeated, according to the monomer and tackifier compositions listed in Table 7.

TABLE 7

| | Composition | | | |
|---|---|---|---|---|
| Adhesive | % Acrylate | | Additives (as pph of Acrylate) | |
| Skin | IOA | AA | TMT | F-85E |
| SKN-1 | 93.0 | 7.0 | 0.15 | 0 |
| SKN-2 | 95.0 | 5.0 | 0.15 | 0 |
| SKN-3 | 93.0 | 7.0 | 0.15 | 20.0 |
| SKN-4 | 90.0 | 10.0 | 0.10 | 0 |

Sample 34

Adhesive skin SKN-1 was laid on a clean 12 by 48 by 0.5-inch (30.5 by 121.9 by 1.27 cm) glass plate and the upper silicone release liner removed. One of the silicone release liners was removed from a sample of visco-elastic core VEC-3, and the exposed surface of the core laid over the exposed adhesive skin of SKN-1. The core and skin were then laminated together by manually applying a hand roller over the release liner of the visco-elastic core. The release liner covering the visco-elastic core removed, as was a release liner of another sample of adhesive skin SKN-1. The skin was then laminated onto the exposed core by means of the hand roller, resulting in a SKN-1:VEC-3:SKN-1 laminate. The laminate was then allowed to dwell for 24 hours at 50% RH and 70° F. (21.1° C.) before testing.

Samples 35-42

The procedure generally described in Sample 34 was repeated, according to the adhesive skin and visco-elastic core constructions listed in Table 8. With respect to Sample 42, the adhesive skin is represented by adhesive transfer tape 467-MP/467-MPF. Physical characteristics of the resultant multi-layer constructions are also presented in Table 8.

Sample 43

A one quart jar glass jar was charged with 405 grams ISA, 45 grams IOA and 0.18 grams 1-651, corresponding to the composition "VEC-7" of Table 5. The monomer mixture was stirred for 30 minutes at 21° C., purged with nitrogen for 5 minutes, and exposed to the low intensity ultraviolet light until a coatable pre-adhesive polymeric syrup was formed. An additional 0.72 grams 1-651 and 0.675 grams TMT were subsequently blended into the polymeric syrup using the high speed mixer. The polymeric syrup was then coated between layers of adhesive transfer tapes 467-MP and 467-MPF, at an approximate thickness of 8 mils (203.2 µm), and cured by means of UV-A light exposure through the 467-MPF side at 2,000 mJ/cm².

Samples 44-46

The procedure generally described in Sample 43 was repeated, according to the compositions for VEC-8, VEC-9 and VEC-10, respectively, listed in Table 5. Physical characteristics of the visco-elastic cores and of the resultant multi-layer constructions are listed in Table 7 and Table 8, respectively.

TABLE 8

| Sample | Adhesive Skin | Visco-Elastic Core | Adhesion To Polyurethane | | Adhesion To Aluminum | |
|---|---|---|---|---|---|---|
| | | | Adhesion Peel Force (N/dm) | Failure Mode | Adhesion Peel Force (N/dm) | Failure Mode |
| 34 | SKN-1 | VEC-3 | 92 | A | 77 | A |
| 35 | SKN-2 | VEC-3 | 39 | A | 59 | A |
| 36 | SKN-1 | VEC-2 | 46 | A | 59 | A |
| 37 | SKN-1 | VEC-1 | 44 | A | 59 | A |
| 38 | SKN-3 | VEC-3 | 55 | A | 83 | A |
| 39 | SKN-4 | VEC-3 | 81 | A | 83 | A |
| 40 | SKN-4 | VEC-4 | 88 | 2B | 77 | 2B |
| 41 | SKN-4 | VEC-6 | 68 | A | 63 | A |
| 42 | 467-MP/MPF | VEC-5 | 70 | A | 112 | A |
| 43 | 467-MP/MPF | VEC-7 | 45 | 2B | 39 | 2B |
| 44 | 467-MP/MPF | VEC-8 | 37 | C | 39 | C |
| 45 | 467-MP/MPF | VEC-9 | 47 | A | 49 | A |
| 46 | 467-MP/MPF | VEC-10 | 53 | C | 51 | C |

Damping Performance

DLF values were determined for selected adhesive samples according to the test method described above. Results are listed in Table 9.

TABLE 9

| | | Loss Factor @ -10° C. | | | Loss Factor @ -20° C. | | |
|---|---|---|---|---|---|---|---|
| Sample | Number of Layers | 120 Hz | 400 Hz | 800 Hz | 120 Hz | 400 Hz | 800 Hz |
| 2 | 1 | 0.21 | 0.23 | 0.21 | 0.13 | 0.16 | 0.17 |
| 15 | 1 | 0.18 | 0.21 | 0.21 | 0.12 | 0.14 | 0.15 |
| 39 | 3 | 0.27 | ND | ND | 0.23 | 0.27 | ND |
| 40 | 3 | 0.27 | 0.26 | ND | 0.24 | ND | ND |
| 41 | 3 | 0.23 | 0.16 | 0.12 | 0.30 | 0.28 | ND |
| 42 | 3 | 0.17 | 0.20 | 0.21 | 0.07 | 0.07 | 0.08 |
| 43 | 3 | 0.26 | 0.20 | 0.17 | 0.27 | 0.16 | 0.18 |

ND = Not detectable

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A viscoelastic construction comprising:
   a) a viscoelastic layer comprising a copolymer of at least one monomer according to formula I:

$$CH_2\!=\!CR^1\!-\!COOR^2 \qquad [I]$$

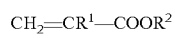

wherein $R^1$ is H, $CH_3$ or $CH_2CH_3$ and $R^2$ is a branched alkyl group containing 12 to 32 carbon atoms, and at least one comonomer selected from the group consisting of acrylic acid, methacrylic acid, ethacrylic acid, acrylic esters, methacrylic esters, and ethacrylic esters, wherein the at least one monomer according to formula I is present in an amount ranging from 75% to 99% by weight relative to the overall weight of the copolymer and further wherein the viscoelastic layer does not include any adhesion-enhancing particulate materials; bound to
   b) at least one PSA layer comprising a pressure sensitive adhesive,
   wherein the viscoelastic layer exhibits a tan delta of greater than 0.5 as measured by Dynamic Mechanical Analysis at −55° C. and 10 Hz.

2. The viscoelastic construction according to claim 1, wherein said viscoelastic layer is bound to at least two layers comprising a pressure sensitive adhesive.

3. The viscoelastic construction according to claim 1 wherein $R^2$ is a branched alkyl group containing 15 to 22 carbon atoms.

4. The viscoelastic construction according to claim 1 wherein $R^2$ is a branched alkyl group containing 16 to 20 carbon atoms.

5. The viscoelastic construction according to claim 1 wherein $R^1$ is H or $CH_3$.

6. The viscoelastic construction according to claim 1 wherein said PSA layer comprises an acrylic pressure sensitive adhesive.

7. The viscoelastic construction according to claim 6 wherein said acrylic pressure sensitive adhesive is a copolymer of acrylic acid.

8. The viscoelastic construction according to claim 1, wherein said viscoelastic layer is a pressure sensitive adhesive.

9. The viscoelastic construction according to claim 1 wherein the viscoelastic layer exhibits a tan delta of greater than 1.0 as measured by Dynamic Mechanical Analysis at −55° C. and 10 Hz.

10. The viscoelastic construction according to claim 9 wherein the viscoelastic layer exhibits a tan delta of greater than 1.4 as measured by Dynamic Mechanical Analysis at −55° C. and 10 Hz.

11. The viscoelastic construction according to claim 1 wherein the viscoelastic construction exhibits a peel adhesion of greater than 10 N/dm.

12. The viscoelastic construction according to claim 11 wherein the viscoelastic construction exhibits a peel adhesion of greater than 30 N/dm.

13. The viscoelastic construction according to claim 12 wherein the viscoelastic construction exhibits a peel adhesion of greater than 50 N/dm.

14. The viscoelastic construction according to claim 1, wherein the at least one comonomer comprises (meth)

acrylic acid, hydroxyethyl (meth)acrylate, dimethylaminoethyl (meth)acrylate, monofunctional silicone (meth)acrylates, and isobornyl (meth)acrylate.

16. The viscoelastic construction according to claim 14, wherein the at least one comonomer comprises dimethylaminoethyl (meth)acrylate.

16. A viscoelastic construction comprising:
a) a viscoelastic layer consisting essentially of a copolymer of at least one monomer according to formula I:

$$CH_2=CR^1-COOR^2 \qquad [I]$$

wherein $R^1$ is H, $CH_3$ or $CH_2CH_3$ and $R^2$ is a branched alkyl group containing 12 to 32 carbon atoms, and at least one comonomer selected from the group consisting of acrylic acid, methacrylic acid, ethacrylic acid, acrylic esters, methacrylic esters, and ethacrylic esters, wherein the at least one monomer according to formula I is present in an amount ranging from 75% to 99% by weight relative to the overall weight of the copolymer; bound to
b) at least one PSA layer comprising a pressure sensitive adhesive,
wherein the viscoelastic layer exhibits a tan delta of greater than 0.5 as measured by Dynamic Mechanical Analysis at −55° C. and 10 Hz.

* * * * *